US012645613B2

(12) United States Patent
Guan et al.

(10) Patent No.: US 12,645,613 B2
(45) Date of Patent: Jun. 2, 2026

(54) MEMORY EXTENSION DEVICE, OPERATION METHOD OF MEMORY EXTENSION DEVICE, AND COMPUTER READABLE STORAGE MEDIUM FOR EXECUTING OPERATION METHOD

(71) Applicant: Alibaba Innovation Private Limited, Singapore (SG)

(72) Inventors: Tianchan Guan, Shanghai (CN); Yijin Guan, Beijing (CN); Dimin Niu, Sunnyvale, CA (US); Jiacheng Ma, San Jose, CA (US); Zhaoyang Du, Hangzhou (CN); Hongzhong Zheng, Los Gatos, CA (US)

(73) Assignee: Alibaba Innovation Private Limited, Singapore (SG)

( * ) Notice: Subject to any disclaimer, the term of this patent is extended or adjusted under 35 U.S.C. 154(b) by 54 days.

(21) Appl. No.: 18/654,767

(22) Filed: May 3, 2024

(65) Prior Publication Data

US 2024/0370384 A1    Nov. 7, 2024

(30) Foreign Application Priority Data

May 5, 2023    (CN) .......................... 202310499884.9

(51) Int. Cl.
G06F 13/16        (2006.01)
G06F 13/42        (2006.01)
(52) U.S. Cl.
CPC ...... G06F 13/1668 (2013.01); G06F 13/4221 (2013.01)
(58) Field of Classification Search
CPC .......................... G06F 13/1668; G06F 13/4221

USPC ......................................................... 710/305
See application file for complete search history.

(56)             References Cited

U.S. PATENT DOCUMENTS

| | | | | |
|---|---|---|---|---|
| 8,301,717 | B2 * | 10/2012 | Deshpande ......... | G06F 12/1009 |
| | | | | 709/216 |
| 8,621,130 | B2 * | 12/2013 | Daniel ................ | G06F 13/4059 |
| | | | | 713/1 |
| 8,719,547 | B2 * | 5/2014 | Chinya ............... | G06F 12/1036 |
| | | | | 711/202 |
| 11,334,245 | B1 * | 5/2022 | Hormuth ............... | G06F 3/0604 |
| 11,341,060 | B2 * | 5/2022 | Siegel ................. | G06F 12/1072 |
| 2009/0027844 | A1 * | 1/2009 | Chen .................... | G06F 13/409 |
| | | | | 361/679.31 |
| 2018/0248910 | A1 * | 8/2018 | Tu ........................ | H04L 63/0227 |

(Continued)

*Primary Examiner* — Christopher B Shin
(74) *Attorney, Agent, or Firm* — Finnegan, Henderson, Farabow, Garrett & Dunner, LLP

(57)                ABSTRACT

This disclosure discloses a memory extension device, an operation method of the memory extension device, and a computer readable storage medium for executing the operation method. The method includes: converting local information received from a local host into local transaction layer information according to a first sub-protocol of a coherent interconnection protocol; converting the local transaction layer information into converted local transaction layer information according to a second sub-protocol of the coherent interconnection protocol, the converted local transaction layer information conforming to the second sub-protocol; packaging the converted local transaction layer information into a plurality of local data packets; and transmitting the plurality of local data packets to a remote memory extension device.

19 Claims, 3 Drawing Sheets

(56)                    References Cited

U.S. PATENT DOCUMENTS

| 2022/0114125 | A1 * | 4/2022 | Thakur | G06F 13/4022 |
| 2022/0283972 | A1 * | 9/2022 | Tummala | G06F 13/4004 |
| 2023/0112225 | A1 * | 4/2023 | Franciosi | G06F 9/45558 |
| | | | | 718/1 |
| 2024/0256441 | A1 * | 8/2024 | Hyatt | G06F 12/0246 |
| 2024/0264957 | A1 * | 8/2024 | Jung | G06F 12/0246 |

* cited by examiner

30

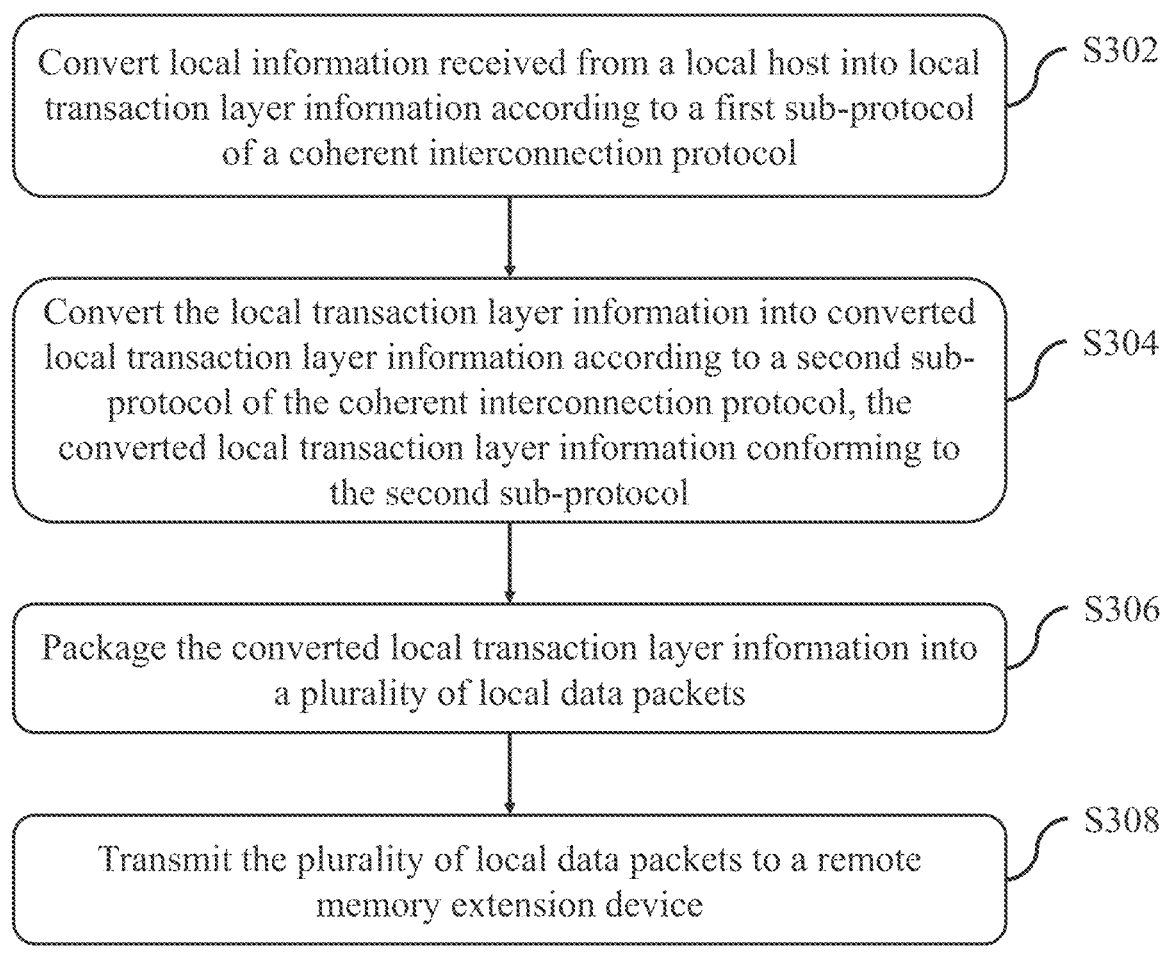

Convert local information received from a local host into local transaction layer information according to a first sub-protocol of a coherent interconnection protocol    S302

Convert the local transaction layer information into converted local transaction layer information according to a second sub-protocol of the coherent interconnection protocol, the converted local transaction layer information conforming to the second sub-protocol    S304

Package the converted local transaction layer information into a plurality of local data packets    S306

Transmit the plurality of local data packets to a remote memory extension device    S308

FIG. 3

MEMORY EXTENSION DEVICE, OPERATION METHOD OF MEMORY EXTENSION DEVICE, AND COMPUTER READABLE STORAGE MEDIUM FOR EXECUTING OPERATION METHOD

CROSS-REFERENCE TO RELATED APPLICATIONS

The disclosure claims the benefits of priority to Chinese Application No. 202310499884.9, filed on 5 May 2023, which is incorporated herein by reference in its entirety.

TECHNICAL FIELD

The present disclosure relates to a memory extension device, an operation method of the memory extension device, and a computer readable storage medium for executing the operation method, and more particularly relates to a memory extension device supporting transaction layer protocol conversion, an operation method of the memory extension device supporting transaction layer protocol conversion, and a computer readable storage medium for executing the operation method.

BACKGROUND

In a cloud computing system, a host will allocate memories to different virtual machines. When the capacity of the remaining memory is less than the capacity of a memory for running one virtual machine, or when the capacity of the memory for running one virtual machine exceeds the capacity of all the memories of the host, the host may access other hosts and borrow the memories of the other hosts to the virtual machines for use through memory extension, thus meeting the requirement for the capacity of the memory for the operation of the virtual machines.

When memory extension is achieved, the hosts are not directly connected with one another, each host is coupled with a memory extension device, and memories of other hosts are accessed through connection among a plurality of memory extension devices, so as to achieve memory extension among the plurality of hosts. Because protocol used by the host for accessing the memory of the memory extension device is different from the communication protocol used by the memory extension device for accessing the memory of the host, when memory extension is executed, the memory extension device needs to execute protocol conversion between the two communication protocols.

Generally, protocol conversion is performed in a data link layer. However, since an existing hardware platform already includes the data link layer and a transaction layer, a user can only acquire the information of the transaction layer through a user interface of the hardware platform, and cannot acquire a data flit about the data link layer to perform protocol conversion.

SUMMARY

The disclosed embodiments of the present provide a memory extension device supporting transaction layer protocol conversion, an operation method of the memory extension device, and a computer readable storage medium for executing the operation method so as to solve the problem above.

Some embodiments of the present disclosure provide a memory extension device, including: a first interface configured to facilitate the memory extension device to communicate with a local host through a coherent interconnection protocol, the coherent interconnection protocol comprising a first sub-protocol and a second sub-protocol, wherein: the first sub-protocol is configured to be used by the local host to access the memory extension device and by the memory extension device to convert local information received from the local host into local transaction layer information, and the second sub-protocol is configured to be used by the memory extension device to access the local host; a second interface configured to facilitate the memory extension device to communicate with a remote memory extension device; a transaction conversion module configured to receive the local transaction layer information from the first interface, and convert the local transaction layer information into converted local transaction layer information according to the second sub-protocol, the converted local transaction layer information conforming to the second sub-protocol; and a private protocol processing module configured to package the converted local transaction layer information into a plurality of local data packets, and transmit the plurality of local data packets to the remote memory extension device through the second interface.

Some embodiments of the present disclosure provide an operation method of a memory extension device, including: converting local information received from a local host into local transaction layer information according to a first sub-protocol of a coherent interconnection protocol; converting the local transaction layer information into converted local transaction layer information according to a second sub-protocol of the coherent interconnection protocol, the converted local transaction layer information conforming to the second sub-protocol; packaging the converted local transaction layer information into a plurality of local data packets; and transmitting the plurality of local data packets to a remote memory extension device.

Some embodiments of the present disclosure provide non-transitory computer-readable storage medium storing instructions that are executable by one or more processors of a device to cause the device to perform any of the methods described herein.

BRIEF DESCRIPTION OF THE DRAWINGS

The accompanying drawings described herein are used for providing a further understanding of this disclosure, and form part of this disclosure. Exemplary embodiments of this disclosure and descriptions thereof are used for explaining this disclosure, and do not constitute any inappropriate limitation to this disclosure. It is to be noted that according to standard practice in the industry, various structures are not drawn to scale. In fact, for the clear description, the size of various structures can be arbitrarily increased or decreased. In the accompanying drawings:

FIG. 3 is a schematic diagram of an exemplary operation method of a memory extension device, according to some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims. Particular aspects of the present disclosure are described in greater detail below. The terms and definitions provided herein control, if in conflict with terms or definitions incorporated by reference.

According to some embodiments of the present disclosure, in the memory extension device, the local transaction layer information acquired through the first interface can be directly used for protocol conversion in a transaction layer. Therefore, the memory extension device according to some embodiments of the present disclosure supports protocol conversion in the transaction layer, and can be matched with hardware providing transaction layer information, and then the cost of a construction system for implementing memory extension is reduced.

Figure 1:
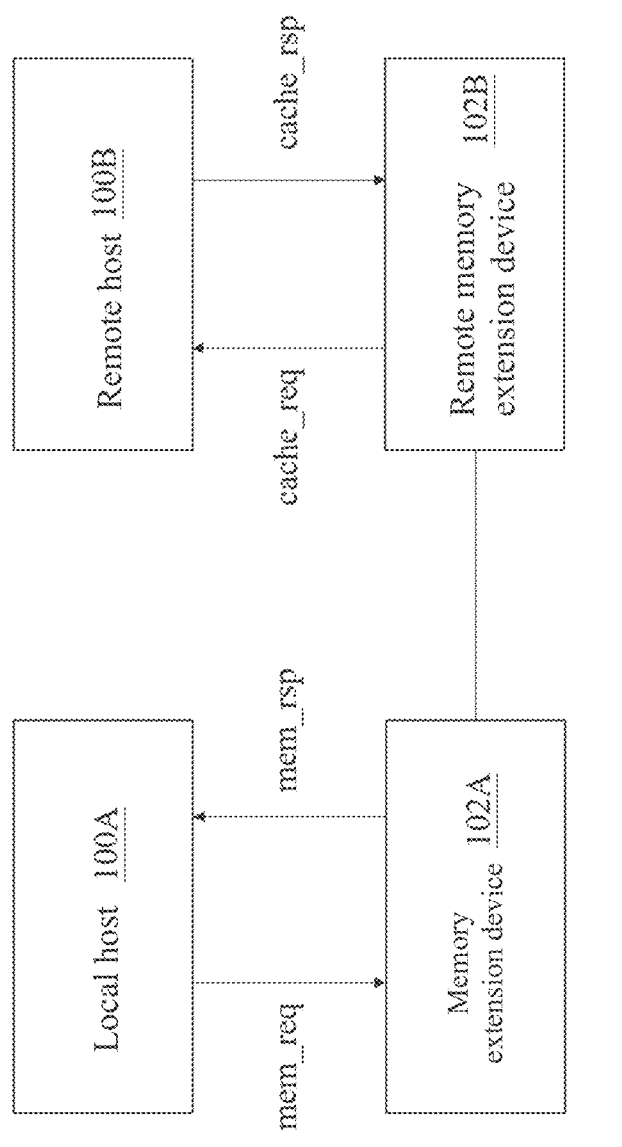
FIG. 1 is a schematic diagram of an exemplary communication system for implementing memory extension, according to some embodiments of the present disclosure.

FIG. 1 is a schematic diagram of an exemplary communication system 10 for implementing memory extension according to some embodiments of the present disclosure. As shown in FIG. 1, communication system 10 includes a local host 100A, a memory extension device 102A, a remote host 100B and a remote memory extension device 102B. Local host 100A and remote host 100B are coupled with memory extension device 102A and remote memory extension device 102B respectively, so as to communicate with memory extension device 102A and remote memory extension device 102B respectively. Memory extension device 102A can communicate with remote memory extension device 102B according to a private communication protocol. Through communication system 10, local host 100A can access a local memory and can also access a remote memory of remote host 100B through memory extension device 102A and remote memory extension device 102B.

When local host 100A is to access the remote memory of remote host 100B, local host 100A will transmit a request mem_req to memory extension device 102A according to the communication protocol through which the host accesses the memory of the memory extension device (for example, a CXL.mem protocol through which a host processor can access memory function of a peripheral device in a consistent cache manner). Since the communication protocol through which the host accesses the memory of the memory extension device is different from the communication protocol through which the memory extension device accesses the memory of the host (for example, a CXL.cache protocol through which the peripheral device can access the memory function of the host processor), after receiving the request mem_req from local host 100A, memory extension device 102A will convert the request mem_req into a request cache_req that enables remote memory extension device 102B to access the remote memory of remote host 100B according to the communication protocol through which the memory extension device accesses the memory of the host, and transmit the request cache_req to remote memory extension device 102B. After remote memory extension device 102B transmits the request cache_req to remote host 100B, remote host 100B will transmit a response cache_rsp to remote memory extension device 102B. After receiving the response cache_rsp from remote host 100B, remote memory extension device 102B will convert the response cache_rsp into a response mem_rsp that enables memory extension device 102A to access local host 100A according to the communication protocol through which the memory extension device accesses the memory of the host, and transmit the response mem_rsp to memory extension device 102A. Memory extension device 102A will transmit the response mem_rsp to local host 100A to complete the process of memory extension.

Figure 2:
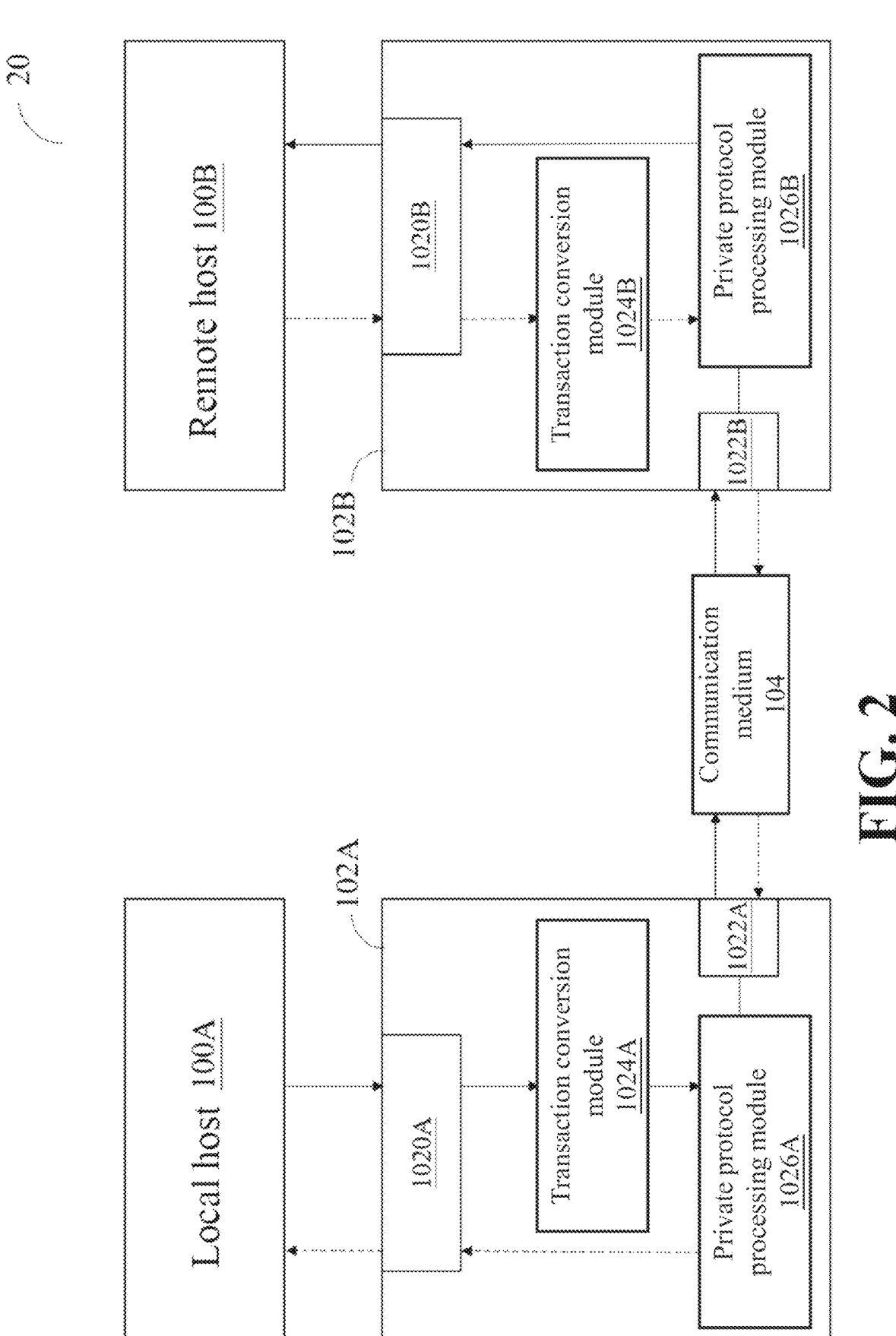
FIG. 2 is a schematic diagram of an exemplary communication system for implementing memory extension, according to some embodiments of the present disclosure.

FIG. 2 is a schematic diagram of an exemplary communication system 20 for implementing memory extension according to some embodiments of the present disclosure. As shown in FIG. 2, communication system 20 includes a local host 100A, a memory extension device 102A, a remote host 100B and a remote memory extension device 102B. Memory extension device 102A is coupled with local host 100A and is configured to communicate with local host 100A. Remote memory extension device 102B is coupled with remote host 100B and is configured to communicate with remote host 100B. Local host 100A and remote host 100B are coupled with a local memory and a remote memory respectively. Memory extension device 102A is configured to communicate with remote memory extension device 102B according to a private communication protocol. Local host 100A can access the local memory and can also access a remote memory of remote host 100B through memory extension device 102A and remote memory extension device 102B. That is, when local host 100A needs to implement memory extension through communication system 20 (for example, in the situation that the capacity of the remaining unallocated local memory is not enough to run a new virtual machine and need borrow the memories of other hosts), local host 100A is not connected with remote host 100B directly, but it can access the remote memory of remote host 100B through memory extension device 102A and remote memory extension device 102B.

Memory extension device 102A includes a first interface 1020A, a second interface 1022A, a transaction conversion module 1024A and a private protocol processing module 1026A. Remote memory extension device 102B includes a first interface 1020B, a second interface 1022B, a transaction conversion module 1024B and a private protocol processing module 1026B.

First interface 1020A is configured to enable memory extension device 102A to communicate with local host 100A through the coherent interconnection protocol. The coherent interconnection protocol includes a CXL protocol and includes a first sub-protocol and a second sub-protocol. Specifically, in some embodiments, the coherent interconnection protocol can be the CXL protocol. The first sub-protocol includes a CXL.mem sub-protocol of the CXL protocol. Specifically, in some embodiments, the first sub-protocol can be the CXL.mem sub-protocol of the CXL protocol. According to the first sub-protocol, local host 100A accesses memory extension device 102A (or remote host 100B accesses remote memory extension device 102B). The second sub-protocol includes a CXL.cache sub-protocol of the CXL protocol. Specifically, in some embodiments, the second sub-protocol can be the CXL.cache sub-protocol of the CXL protocol. According to the second sub-protocol, memory extension device 102A accesses local host 100A (remote memory extension device 102B accesses remote host 100B). That is, the first sub-protocol according to which local host 100A accesses memory extension device 102A is different from the second sub-protocol according to which memory extension device 102A accesses the local memory of local host 100A. When local host 100A is to transmit a request (e.g., a request mem_req in FIG. 1) to access the remote memory of remote host 100B through the communication system 20, the request is to be converted according to the second sub-protocol into a request (e.g., a request cache_req in FIG. 1) that enables remote memory extension device 102B to access remote host 100B.

According to the first sub-protocol, memory extension device 102A will convert the local information received from local host 100A into local transaction layer information through a data physical layer, a data link layer and a transaction layer of first interface 1020A in sequence. That is, the local information entering memory extension device 102A from local host 100A passes through first interface 1020A firstly. Then the local information is converted into the local transaction layer information through the physical layer, the data link layer and the transaction layer of first interface 1020A in sequence. That is, in memory extension device 102A, information for the user can be provided as the local transaction layer information converted through the transaction layer.

Second interface 1022A is configured to enable memory extension device 102A to communicate with remote memory extension device 102B through the communication medium 104. Communication medium 104 may be an Ethernet or optical fiber interface, but is not so limited.

Transaction conversion module 1024A is configured to receive the local transaction layer information from first interface 1020A, and convert the local transaction layer information into converted local transaction layer information in the transaction layer according to the second sub-protocol, so that the converted local transaction layer information conforms to the second sub-protocol according to which remote memory extension device 102B accesses remote host 100B. That is, transaction conversion module 1024A in memory extension device 102A is configured to execute communication protocol conversion in memory extension in the transaction layer. The local transaction layer information is generated by converting local information in first interface 1020A according to the first sub-protocol, but the local transaction layer information does not conform to the second sub-protocol according to which remote memory extension device 102B accesses remote host 100B. Therefore, transaction conversion module 1024A converts the local transaction layer information into the converted local transaction layer information in the transaction layer according to the second sub-protocol, and the converted local transaction layer information can conform to the second sub-protocol according to which remote memory extension device 102B accesses remote host 100B, so as to complete the communication protocol conversion in the memory extension.

In some embodiments, first interface 1020A may be a user interface associated with intellectual property (CXL IP) of the coherent interconnection protocol. Generally, the communication protocol conversion in the memory extension is usually performed in the data link layer. However, in practice, the information provided to the user interface by the CXL IP is the transaction layer information, so that the communication system cannot execute communication protocol conversion on the data link layer through the information provided to the user interface by the CXL IP. In some embodiments of this disclosure, the transaction layer information provided by the CXL IP can be directly provided to memory extension device 102A through first interface 1020A for protocol conversion in the transaction layer, so that the CXL IP can be directly adapted to memory extension device 102A through first interface 1020A of memory extension device 102A. Therefore, since the transaction layer information provided by the CXL IP can be directly utilized, memory extension device 102A according to some embodiments of this disclosure has the advantages of low cost and easy configuration in the communication system for memory extension.

In some embodiments, the local transaction layer information includes a local physical address associated with local host 100A, and transaction conversion module 1024A will convert a local physical address into a remote physical address of remote host 102A according to the second sub-protocol. That is, the communication protocol conversion executed by memory extension device 102A also includes physical address conversion between local host 100A and remote host 102A. Since the address domains of local host 100A and remote host 102A may be different, the local physical address associated with local host 100A in the local transaction layer information can be converted into the remote physical address associated with remote host 102A through transaction conversion module 1024A.

In some embodiments, the local transaction layer information includes a plurality of communication operation instructions, and transaction conversion module 1024A will convert the plurality of communication operation instructions into a plurality of converted communication operation instructions according to the second sub-protocol. That is, the communication protocol conversion executed by memory extension device 102A also includes the communication operation instruction conversion between local host 100A and remote host 102A. The definitions of local host 100A and remote host 102A on the communication operation may be different. Hence, the operation instruction in the local transaction layer information is converted into the converted communication operation instruction through transaction conversion module 1024A according to the second sub-protocol, so that the converted communication operation instruction conforms to the second sub-protocol according to which remote memory extension device 102B accesses remote host 102A. The plurality of communication operation instructions include at least one of a read instruction, a write instruction and a failure instruction, but are not limited.

In some embodiments, the local transaction layer information includes meta data, and transaction conversion module 1024A will convert the meta data into converted meta data according to the second sub-protocol. The meta data is a state of currently related data of communication protocol conversion in a cache in local host 100A and memory extension device 102A, and the state includes modified, exclusive, shared and invalid. Because the types of meta data supported by different sub-protocols may be different, the meta data in the local transaction layer information is converted into the corresponding converted meta data through transaction conversion module 1024A according to the second sub-protocol, and the converted meta data conforms to the second sub-protocol according to which remote memory extension device 102B accesses remote host 102A.

Private protocol processing module 1026A is configured to package the converted local transaction layer information received from transaction conversion module 1024A into a plurality of local data packets according to the private communication protocol, and transmit the plurality of local data packets to remote memory extension device 102B through second interface 1022A. The private communication protocol is a communication protocol defined by memory extension device 102A and remote memory extension device 102B, and the communication operation can be executed between memory extension device 102A and remote memory extension device 102B according to the private communication protocol.

It is to be noted that other hosts (such as remote host 100B) other than local host 100A may access the local memory of local host 100A due to the need for memory extension, and the communication operation between local host 100A and memory extension device 102A can also be performed between remote host 100B and remote memory extension device 102B.

In some embodiments, private protocol processing module 1026A also receives a plurality of remote data packets from remote memory extension device 102B through second interface 1022A, decomposes the plurality of remote data packets into converted remote transaction layer information, and transmits the converted remote transaction layer information to local host 100A according to the second sub-protocol through first interface 1020A. That is, in addition to generating the plurality of data packets and transmitting the plurality of data packets to remote memory extension device 102B (or other memory extension devices), memory extension device 102A can also receive the plurality of remote data packets from remote memory extension device 102B (or other memory extension devices) through second interface 1022A. After receiving the plurality of remote data packets, memory extension device 102A decomposes the plurality of remote data packets into converted remote transaction layer information. The converted remote transaction layer information is generated by converting remote host information according to the second sub-protocol by transaction conversion module 1024B of remote memory extension device 102B.

In some embodiments, in the data link layer, memory extension device 102A converts the converted remote transaction layer information into data link layer information, and transmits the data link layer information to local host 100A through first interface 1020A. That is, in memory extension device 102A, the remote transaction layer information received (e.g., CXL IP) through first interface 1020A is to be converted into the data link layer information and then can be received by local host 100A, and memory extension device 102A can convert the remote transaction layer information into the data link layer information according to the characteristics (e.g., quality of service) of the CXL IP. The data link layer information can be data flit, but is not so limited.

In some embodiments, memory extension device 102A and remote memory extension device 102B can be implemented by a Field Programmable Field Array (FPGA), but is not so limited.

In some embodiments, memory extension device 102A and remote memory extension device 102B may include a memory, a processor, and a computer program stored on the memory and executable on the processor. The processor and the memory may be connected by a bus or other ways. The memory is operable as a non-transitory computer-readable storage medium to store non-transitory software programs and non-transitory computer-executable programs. In some embodiments, the memory may include a high-speed random access memory, and may also include a non-transitory memory, such as at least one disk storage device, flash memory device, or other non-transitory solid-state storage device. In some embodiments, the memory may include memories remotely set with respect to the processor, which may be connected to the processor by a network. Examples of the aforementioned networks include, but are not limited to, the Internet, intranet, local area network, mobile communication network, and combinations thereof.

Some embodiments of the present disclosure provide an operation method of a memory extension device. FIG. 3 is a schematic diagram of an exemplary operation method 30 of a memory extension device, according to some embodiments of the present disclosure. As shown in FIG. 3, method 30 may include steps S302 to S308, which can be implemented a memory extension device (e.g., memory extension device 102A shown in FIG. 2).

In step S302, the memory extension device may convert local information received from a local host into local transaction layer information according to a first sub-protocol of a coherent interconnection protocol.

In step S304, the memory extension device may convert the local transaction layer information into converted local transaction layer information according to a second sub-protocol of the coherent interconnection protocol, so that the converted local transaction layer information conforms to the second sub-protocol.

In step S306, the memory extension device may package the converted local transaction layer information into a plurality of local data packets.

In step S308, the memory extension device may transmit the plurality of local data packets to a remote memory extension device.

The other aspects of method 30 can be understood by referring to the description above with respect to FIGS. 1 and 2, and will not repeat here.

Some embodiments of the present disclosure provide a non-transitory software program and instructions for implementing the operation method of the memory extension device stored in the memory. When the program and instructions are executed by the processor, the operation method of the memory extension device according to some embodiments described herein can be executed.

In addition, some embodiments of this disclosure also provide a computer readable storage medium. The computer readable storage medium is included in the memory of memory extension device 102A or remote memory extension device 102B and is used for storing computer executable instructions. The computer executable instructions are executed by the processor (such as the processor of memory extension device 102A or remote memory extension device 102B) or a controller, and the processor or the controller can execute the operation method of memory extension executed by memory extension device 102A or remote memory extension device 102B in some of the above embodiments.

It is appreciated that all or some of the steps, and systems in the methods disclosed herein may be implemented as software, firmware, hardware, and appropriate combinations thereof. Some or all of the physical components may be implemented as software executed by the processor, such as a central processor, digital signal processor or microprocessor, or as hardware, or as an integrated circuit, such as an application specific integrated circuit. Such software may be distributed in computer-readable medium, which may include computer storage medium (or non-transitory medium) and communication medium (or transitory medium). As can be appreciated, the term computer storage medium include volatile and non-volatile, removable and non-removable medium implemented in any method or technique for storing information, such as computer-readable instructions, data structures, program modules, or other data. The computer storage medium include, but are not limited to, RAM, ROM, electronic erasable programmable read-only memory (EEPROM), flash memory or other memory technology, CD-ROM, digital versatile disc (DVD) or other optical disc storage, magnetic cassettes, magnetic tapes, disk storage or other magnetic storage, or any other medium that can be used to store desired information and that can be accessed by a computer. In addition, as can be appreciated, the communication medium generally contain computer-readable instructions, data structures, program modules, or other data in modulated data signals, such as carriers or other transmission mechanisms, and can include any information delivery medium.

In conclusion, according to the memory extension device, the operation method of the memory extension device and the computer readable storage medium for executing the operation method in this disclosure, the communication protocol conversion in memory extension may be carried out in the transaction layer; the received transaction layer information (e.g., received from the user interface of CXL IP) can be directly utilized, so that through the memory extension device, the operation method of the memory extension device and the computer readable storage medium for executing the operation method according to this disclosure, the construction of the communication system of memory extension has the advantages of low cost and easy configuration.

The embodiments may further be described using the following clauses:

1. An operation method of a memory extension device, including:

converting local information received from a local host into local transaction layer information according to a first sub-protocol of a coherent interconnection protocol;

converting the local transaction layer information into converted local transaction layer information according to a second sub-protocol of the coherent interconnection protocol, the converted local transaction layer information conforming to the second sub-protocol;

packaging the converted local transaction layer information into a plurality of local data packets; and transmitting the plurality of local data packets to a remote memory extension device.

2. The method according to clause 1, wherein the coherent interconnection protocol includes a CXL protocol, the first sub-protocol includes a CXL.mem sub-protocol of the CXL protocol, and the second sub-protocol includes a CXL.cache sub-protocol of the CXL protocol.

3. The method according to clause 1 or 2, wherein the local transaction layer information includes a local physical address associated with the local host; and the method further includes:

converting the local physical address into a remote physical address of a remote host according to the second sub-protocol.

4. The method according to any of clauses 1 to 3, wherein the local transaction layer information includes a plurality of communication operation instructions; and the method further includes:

converting the plurality of communication operation instructions into a plurality of converted communication operation instructions according to the second sub-protocol.

5. The method according to any of clauses 1 to 4, wherein the local transaction layer information includes meta data; and the method further includes:

converting the meta data into converted meta data according to the second sub-protocol.

6. The method according to any of clauses 1 to 5, further including:

receiving a plurality of remote data packets from the remote memory extension device, decomposing the plurality of remote data packets into converted remote transaction layer information, and transmitting the converted remote transaction layer information to the local host according to the second sub-protocol; and converting the converted remote transaction layer information into data link layer information, and transmitting the data link layer information to the local host.

7. A memory extension device, including:

a first interface configured to facilitate the memory extension device to communicate with a local host through a coherent interconnection protocol, the coherent interconnection protocol comprising a first sub-protocol and a second sub-protocol, wherein:

the first sub-protocol is configured to be used by the local host to access the memory extension device and by the memory extension device to convert local information received from the local host into local transaction layer information, and the second sub-protocol is configured to be used by the memory extension device to access the local host;

a second interface configured to facilitate the memory extension device to communicate with a remote memory extension device;

a transaction conversion module configured to receive the local transaction layer information from the first interface, and convert the local transaction layer information into converted local transaction layer information according to the second sub-protocol, the converted local transaction layer information conforming to the second sub-protocol; and a private protocol processing module configured to package the converted local transaction layer information into a plurality of local data packets, and transmit the plurality of local data packets to the remote memory extension device through the second interface.

8. The memory extension device according to clause 7, wherein the coherent interconnection protocol includes a CXL protocol; the first sub-protocol includes a CXL.mem sub-protocol of the CXL protocol; and the second sub-protocol includes a CXL.cache sub-protocol of the CXL protocol.

9. The memory extension device according to clause 7 or 8, wherein the local transaction layer information includes a local physical address associated with the local host; and the transaction conversion module is configured to convert the local physical address into a remote physical address of a remote host according to the second sub-protocol.

10. The memory extension device according to any of clauses 7 to 9, wherein the local transaction layer information includes a plurality of communication operation instructions; and wherein the transaction conversion module is configured to convert the plurality of communication operation instructions into a plurality of converted communication operation instructions according to the second sub-protocol.

11. The memory extension device according to any of clauses 7 to 10, wherein the local transaction layer information includes meta data; and wherein the transaction conversion module is configured to convert the meta data into converted meta data according to the second sub-protocol.

12. The memory extension device according to any of clauses 7 to 11, wherein the private protocol processing module is further configured to receive a plurality of remote data packets from the remote memory extension device through the second interface, decompose the plurality of remote data packets into converted remote transaction layer information, and transmit the converted remote transaction layer information to the local host according to the second sub-protocol through the first interface.

13. The memory extension device according to any of clauses 7 to 13, wherein the memory extension device is configured to convert the converted remote transaction layer information into data link layer information, and transmit the data link layer information to the local host through the first interface.

14. A non-transitory computer-readable storage medium, storing a set of instructions that are executable by one or more processors of a device to cause the device to perform operations including:

converting local information received from a local host into local transaction layer information according to a first sub-protocol of a coherent interconnection protocol;

converting the local transaction layer information into converted local transaction layer information according to a second sub-protocol of the coherent interconnection protocol, the converted local transaction layer information conforming to the second sub-protocol;

packaging the converted local transaction layer information into a plurality of local data packets; and transmitting the plurality of local data packets to a remote memory extension device.

15. The non-transitory computer-readable storage medium according to clause 14, wherein the coherent interconnection protocol includes a CXL protocol, the first sub-protocol includes a CXL.mem sub-protocol of the CXL protocol, and the second sub-protocol includes a CXL.cache sub-protocol of the CXL protocol.

16. The non-transitory computer-readable storage medium according to clause 14 or 15, wherein the local transaction layer information includes a local physical address associated with the local host; and the method further includes:

converting the local physical address into a remote physical address of a remote host according to the second sub-protocol.

17. The non-transitory computer-readable storage medium according to any of clauses 14 to 16, wherein the local transaction layer information includes a plurality of communication operation instructions; and the method further includes:

converting the plurality of communication operation instructions into a plurality of converted communication operation instructions according to the second sub-protocol.

18. The non-transitory computer-readable storage medium according to any of clauses 14 to 17, wherein the local transaction layer information includes meta data; and the method further includes:

converting the meta data into converted meta data according to the second sub-protocol.

19. The non-transitory computer-readable storage medium according to any of clauses 14 to 18, further including:

receiving a plurality of remote data packets from the remote memory extension device, decomposing the plurality of remote data packets into converted remote transaction layer information, and transmitting the converted remote transaction layer information to the local host according to the second sub-protocol; and converting the converted remote transaction layer information into data link layer information, and transmitting the data link layer information to the local host.

As used herein, a first member formed at the upper part of or on a second member may include embodiments in which the first and second members are in direct contact, and may also include embodiments in which additional members may be formed between the first and second members so that the first and second members are not in direct contact. In addition, some embodiments of this disclosure may refer to numbers or letters repeatedly in various examples. This repetition is for the objective of simplicity and clarity and does not in itself indicate the relationship between the various embodiments or configurations discussed.

In addition, for ease of description, e.g., the spatial relative terms "under", "at the lower part of", "down", "at the upper part of", "up", "on" and similar may be used herein to describe the relationship of a component or member to a remote component or member illustrated in the figures. In addition to the orientations depicted in the figure, spatial relative terms is also required to cover the different orientations of the device in use or operation. Devices may be oriented in other ways (rotated by 90° or other oriented), and therefore the spatial relative descriptors used herein can be interpreted in the same way.

As used herein, terms such as "first", "second", and "third" describe various components, members, zones, layers, or sections, but such components, members, zones, layers, or sections should not be restricted by such terms. Such terms may only be used for distinguishing a component, a member, a zone, a layer, or a section from one another. The terms such as "first", "second", and "third" when used herein, do not imply sequence or order, unless expressly indicated by the background context.

The singular forms "one", "a" and "the" may also include the plural form, unless the context explicitly indicates otherwise. The term "connection" together with its derivatives may be used herein to describe the structural relationship between components. "Connection" may be used for describing two or more components in direct physical or electrical contact with each other. "Connection" may also be used for indicating that two or more components are in direct or indirect physical or electrical contact with each other (an intervening component between them), or that the two or more components collaborate or interact with each other.

The foregoing descriptions are merely preferred implementations of the present disclosure. It is to be noted that a plurality of improvements and refinements may be made by those of ordinary skill in the technical field without departing from the principle of the present disclosure, and shall fall within the scope of protection of the present disclosure.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for operating a memory extension device, comprising:

converting, through a first interface of the memory extension device, first information received from a local host into second information in a transaction layer according to a first sub-protocol of a coherent interconnection protocol;

converting, by a transaction conversion module, the second information into third information in the transaction layer according to a second sub-protocol of the coherent interconnection protocol, the third information conforming to the second sub-protocol;

generating, by a private protocol processing module, a plurality of data packets according to the third information; and transmitting, by the private protocol processing module, the plurality of data packets to a remote memory extension device.

2. The method according to claim 1, wherein the coherent interconnection protocol comprises a CXL protocol, the first sub-protocol comprises a CXL.mem sub-protocol of the CXL protocol, and the second sub-protocol comprises a CXL.cache sub-protocol of the CXL protocol.

3. The method according to claim 1, wherein the second information comprises a local physical address associated with the local host; and the method further comprises:

converting the local physical address into a remote physical address of a remote host according to the second sub-protocol.

4. The method according to claim 1, wherein the second information comprises a plurality of communication operation instructions; and the method further comprises:

converting the plurality of communication operation instructions into a plurality of converted communication operation instructions according to the second sub-protocol.

5. The method according to claim 1, wherein the second information comprises meta data; and the method further comprises:

converting the meta data into converted meta data according to the second sub-protocol.

6. The method according to claim 1, further comprising:

receiving a plurality of remote data packets from the remote memory extension device, decomposing the plurality of remote data packets into fourth information, and transmitting the fourth information to the local host according to the second sub-protocol; and converting the fourth information into fifth information in a data link layer, and transmitting the fifth information to the local host.

7. A memory extension device, comprising:

a first interface configured to facilitate the memory extension device to communicate with a local host through a coherent interconnection protocol, the coherent interconnection protocol comprising a first sub-protocol and a second sub-protocol, wherein:

the local host is configured to use the first sub-protocol to access the memory extension device and the memory extension device is configured to convert first information received from the local host into second information in a transaction layer according to the first sub-protocol, and the memory extension device is configured to access the local host according to the second sub-protocol;

a second interface configured to facilitate the memory extension device to communicate with a remote memory extension device;

a transaction conversion module configured to receive the second information from the first interface, and convert the second information into third information in the transaction layer according to the second sub-protocol, the third information conforming to the second sub-protocol; and a private protocol processing module configured to generate a plurality of data packets according to the third information, and transmit the plurality of data packets to the remote memory extension device through the second interface.

8. The memory extension device according to claim 7, wherein the coherent interconnection protocol comprises a CXL protocol; the first sub-protocol comprises a CXL.mem sub-protocol of the CXL protocol; and the second sub-protocol comprises a CXL.cache sub-protocol of the CXL protocol.

9. The memory extension device according to claim 7, wherein the second information comprises a local physical address associated with the local host; and the transaction conversion module is configured to convert the local physical address into a remote physical address of a remote host according to the second sub-protocol.

10. The memory extension device according to claim 7, wherein the second information comprises a plurality of communication operation instructions; and wherein the transaction conversion module is configured to convert the plurality of communication operation instructions into a plurality of converted communication operation instructions according to the second sub-protocol.

11. The memory extension device according to claim 7, wherein the second information comprises meta data; and wherein the transaction conversion module is configured to convert the meta data into converted meta data according to the second sub-protocol.

12. The memory extension device according to claim 7, wherein the private protocol processing module is further configured to receive a plurality of remote data packets from the remote memory extension device through the second interface, decompose the plurality of remote data packets into fourth information, and transmit the fourth information to the local host according to the second sub-protocol through the first interface.

13. The memory extension device according to claim 12, wherein the memory extension device is configured to convert the fourth information into fifth information in a data link layer, and transmit the fifth information to the local host through the first interface.

14. A non-transitory computer-readable storage medium, storing a set of instructions that are executable by one or more processors of a device to cause the device to perform operations comprising:

converting, through a first interface of the device, first information received from a local host into second information in a transaction layer according to a first sub-protocol of a coherent interconnection protocol;

converting, by a transaction conversion module, the second information into third information in the transaction layer according to a second sub-protocol of the coherent interconnection protocol, the third information conforming to the second sub-protocol;

generating, by a private protocol processing module, a plurality of data packets according to the third information; and transmitting, by the private protocol processing module, the plurality of data packets to a remote memory extension device.

15. The non-transitory computer-readable storage medium according to claim 14, wherein the coherent interconnection protocol comprises a CXL protocol, the first sub-protocol comprises a CXL.mem sub-protocol of the CXL protocol, and the second sub-protocol comprises a CXL.cache sub-protocol of the CXL protocol.

16. The non-transitory computer-readable storage medium according to claim 14, wherein the second information comprises a local physical address associated with the local host; and the operations further comprise:

converting the local physical address into a remote physical address of a remote host according to the second sub-protocol.

17. The non-transitory computer-readable storage medium according to claim 14, wherein the second information comprises a plurality of communication operation instructions; and the operations further comprise:

converting the plurality of communication operation instructions into a plurality of converted communication operation instructions according to the second sub-protocol.

18. The non-transitory computer-readable storage medium according to claim 14, wherein the second information comprises meta data; and the operations further comprise:

converting the meta data into converted meta data according to the second sub-protocol.

19. The non-transitory computer-readable storage medium according to claim 14, the operations further comprising:

receiving a plurality of remote data packets from the remote memory extension device, decomposing the plurality of remote data packets into fourth information, and transmitting the fourth information to the local host according to the second sub-protocol; and converting the fourth information into fifth information in a data link layer, and transmitting the fifth information to the local host.

* * * * *